(No Model.)
H. L. WILLOUGHBY.
SNELL.
No. 396,130. Patented Jan. 15, 1889.
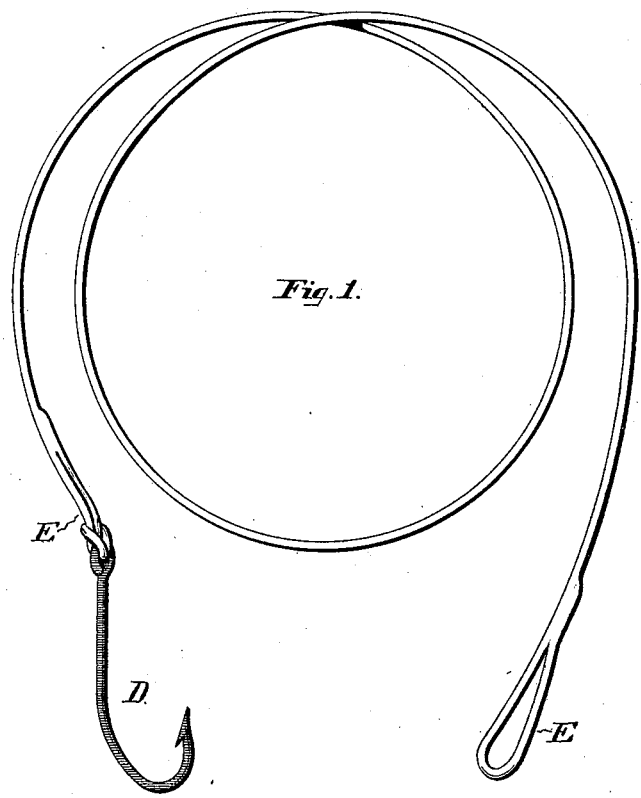
Fig. 1.
Fig. 2.
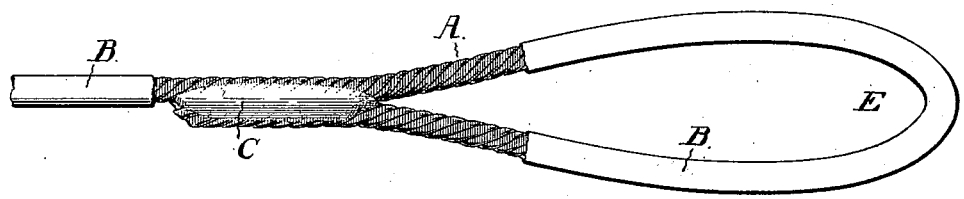
Fig. 3.
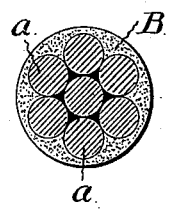
Witnesses:
J. E. Paige
James H. Bell
Inventor
Hugh L. Willoughby.
By Hollingsworth & Haly,
Attorneys.

UNITED STATES PATENT OFFICE.

HUGH L. WILLOUGHBY, OF NEWPORT, RHODE ISLAND.

SNELL.

SPECIFICATION forming part of Letters Patent No. 396,130, dated January 15, 1889.

Application filed November 22, 1888. Serial No. 291,592. (No model.)

*To all whom it may concern:*

Be it known that I, HUGH L. WILLOUGHBY, of Newport, in the State of Rhode Island, have invented a certain new and useful Improvement in Snells for Fishing-Tackle, whereof the following is a specification, reference being had to the accompanying drawings.

In fishing for certain kinds of large and active fish—such as tarpon, &c.—much difficulty is experienced with the ordinary forms of snell by which the hook is attached to the line proper, owing to the fact that the fish is able to bite or crush off the snell at a point near the hook. Various devices have been tried to avoid this danger, but without success. Thus, for instance, wire snells, though possessing the requisite tensile strength, are, owing to their hardness, liable to be broken or chafed through by the teeth of the fish, or if kinked by the struggles of the fish they will snap off. They are, moreover, so conspicuous when in the water as to frighten the game. Cordage of very soft cotton has also been tried, which, while resisting better the teeth of the fish, is not sufficiently strong unless of such a diameter as to be clumsy.

The object of my invention is to provide a snell which, though of moderate thickness, possesses the necessary tensile strength and presents to the teeth of the fish a yielding but tough exterior surface, and which, moreover, may be so colored as to be almost invisible in the water.

In the accompanying drawings, Figure 1 represents a view of the complete snell with hook attached. Fig. 2 is an enlarged view of one end thereof, the covering being partly removed; and Fig. 3 is a cross-section on a still larger scale.

I take wire, preferably of phosphor-bronze, (No. 30 wire being well adapted for this purpose when the snell is to be used in tarpon-fishing.) I preferably use seven strands, $a$, which I twist into a cord, as indicated at A. I prefer to use seven, as that number packs more advantageously by grouping six of the wires in close contact around the seventh, and I find that such a cord has little or no tendency to kink. A loop, E, is formed at each end of the snell by soldering the end back upon the wire cord or in any convenient manner, and a coating of celluloid is then applied to the surface by dipping the wire snell into a solution thereof or in any of the well-known modes. This coating may be colored, so as to be practically invisible in the water.

The advantage of a snell as thus constructed is that, although the celluloid does not add greatly to the bulk thereof, it presents a tough and elastic surface which is very difficult for the fish to bite through, while the interior wire cord has the necessary tensile strength to resist the struggles of the fish.

While I deem celluloid the material best adapted to the purpose, I do not desire to limit my claim to that particular material as a covering. Thus while I believe rubber to be less well adapted to the purpose, in some cases it may answer, and hence I desire to claim as a coating any material which is the equivalent of celluloid in the respect of being tough, elastic, and not affected by water.

Having thus described my invention, I claim—

In a snell for fishing-tackle, the combination of a wire cord and an exterior coating of celluloid or equivalent tough or elastic material, substantially as set forth.

HUGH L. WILLOUGHBY.

Witnesses:
LEWIS R. DICK,
JAMES H. BELL.